US012573649B2

(12) United States Patent (10) Patent No.: US 12,573,649 B2
MacDonald et al. (45) Date of Patent: Mar. 10, 2026

(54) OXIDIZING AGENTS FOR EMERGENCY POWER UNITS

(71) Applicant: Hamilton Sundstrand Corporation, Charlotte, NC (US)

(72) Inventors: Malcolm P. MacDonald, Bloomfield, CT (US); Ram Ranjan, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 540 days.

(21) Appl. No.: 18/163,814

(22) Filed: Feb. 2, 2023

(65) Prior Publication Data

US 2024/0266566 A1 Aug. 8, 2024

(51) Int. Cl.
| | |
|---|---|
| *H01M 8/04701* | (2016.01) |
| *B60L 50/70* | (2019.01) |
| *B60L 58/33* | (2019.01) |
| *B64D 13/06* | (2006.01) |
| *B64D 33/08* | (2006.01) |
| *H01M 8/04014* | (2016.01) |
| *H01M 8/04111* | (2016.01) |
| *B64D 41/00* | (2006.01) |

(52) U.S. Cl.
CPC ......... *H01M 8/04701* (2013.01); *B60L 50/70* (2019.02); *B60L 58/33* (2019.02); *B64D 13/06* (2013.01); *B64D 33/08* (2013.01); *H01M 8/04014* (2013.01); *H01M 8/04111* (2013.01); *B60L 2200/10* (2013.01); *B64D 2013/0611* (2013.01); *B64D 2013/0648* (2013.01); *B64D 2041/005* (2013.01); *H01M 2250/20* (2013.01)

(58) Field of Classification Search
CPC ...... B60L 2200/10; B60L 50/70; B60L 58/33; B64D 13/06; B64D 2013/0611; B64D 2013/0618; B64D 2013/0648; B64D 2041/005; B64D 33/08; B64D 41/00; H01M 2250/20; H01M 8/04014; H01M 8/04111; H01M 8/04701
See application file for complete search history.

(56) References Cited

U.S. PATENT DOCUMENTS

| | | | |
|---|---|---|---|
| 6,641,084 | B1 | 11/2003 | Huber et al. |
| 7,986,052 | B2 | 7/2011 | Marconi |
| 8,468,847 | B2 | 6/2013 | Klewer |
| 8,623,566 | B2 | 1/2014 | Westenberger et al. |
| 10,978,723 | B2 | 4/2021 | Lo et al. |
| 2009/0211273 | A1 | 8/2009 | Klewer |
| 2011/0045370 | A1 | 2/2011 | Westenberger et al. |
| 2022/0340046 | A1* | 10/2022 | Okabe ..................... H01M 8/00 |

FOREIGN PATENT DOCUMENTS

EP 3950509 A1 2/2022

OTHER PUBLICATIONS

European Search Report dated Jul. 2, 2024 in connection with European Patent Application No. 24152453.7, 8 pages.

* cited by examiner

*Primary Examiner* — Victoria H Lynch

(57) ABSTRACT

In accordance with at least one aspect of this disclosure, an emergency power unit system for an aircraft includes a fuel cell system configured to generate power using a fuel and an oxidant, and an oxidant supply system fluidly connected to the fuel cell system to supply the oxidant to the fuel cell system via an oxidant supply line. The oxidant supply system is fluidly connected to an environmental control system of an aircraft.

20 Claims, 3 Drawing Sheets

OXIDIZING AGENTS FOR EMERGENCY POWER UNITS

TECHNICAL FIELD

The present disclosure relates to oxidizing agents, and more particularly to oxidizing agents for emergency power units (e.g., for aircraft).

BACKGROUND

Typical emergency power units use a ram air turbine to generate power in an emergency as well as use ram air as a coolant in one or more applications. A fuel cell can be used as an emergency power unit, but the operating temperature needs to be management to function properly. Traditional thermal management systems for fuel cells can be physically large, can be heavy, and/or can induce a drag on the aircraft. Additionally, a fuel cell needs an oxidizing agent to function. However, supplying compressible fluids to the fuel cell in lower power applications can be difficult.

There is always a need in the art for improvements to emergency power units in the aerospace industry, and in particular, generating and/or supplying oxidizing agents for said emergency power units. This disclosure provides a solution for this need.

SUMMARY

In accordance with at least one aspect of this disclosure, an emergency power unit system for an aircraft includes a fuel cell system configured to generate power using a fuel and an oxidant, and an oxidant supply system fluidly connected to the fuel cell system to supply the oxidant to the fuel cell system via an oxidant supply line. The oxidant supply system is fluidly connected to an environmental control system of an aircraft.

In embodiments, the fuel cell system can include, a fuel cell fluidly connected to the oxidant supply line to receive the oxidant; a compressor configured to receive the oxidant and compress the oxidant upstream of the fuel cell, and a turbine downstream from the fuel cell to receive exhaust flow and operatively connected to the compressor to turn the compressor.

In embodiments, the compressor can be a cabin air compressor operatively connected to supply air to an aircraft cabin and the oxidant can be cabin air compressor exhaust.

In certain embodiments, the oxidant supply line can include a branch point upstream of the aircraft cabin, and at the branch point, a portion of the cabin air compressor exhaust can be diverted to the fuel cell for oxidizing and a portion of the cabin air compressor exhaust can be diverted to the aircraft cabin. In certain embodiments, a heat exchanger can be included in the oxidant supply line upstream of the branch point configured to cool the cabin air compressor exhaust before the cabin air is diverted to the fuel cell and the cabin.

In certain embodiments, the oxidant supply line can include a branch point, and at the branch point, a portion of the cabin air can be diverted to the fuel cell for oxidizing and a portion of the cabin air can be exhausted to ambient. In certain embodiments, the branch point can be the aircraft cabin. In certain such embodiments, the turbine downstream from the fuel cell configured to receive exhaust flow from the fuel cell can be operatively connected to turn a generator to generate electrical power, and may not be connected to another compressor. In certain such embodiments, a heat exchanger can be disposed in the oxidant supply line upstream of the aircraft cabin configured to cool the cabin air compressor exhaust before the cabin air compressor exhaust is supplied to the aircraft cabin.

In embodiments, a fuel supply system can be fluidly connected to the fuel cell system to supply the fuel to the fuel cell system via a fuel supply line, the fuel cell fluidly connected to the fuel supply line to receive the fuel. A thermal management system can be in thermal communication with the fuel cell system to divert heat from the fuel cell system to the thermal management system.

In embodiments, the thermal management system can include a heat transfer device disposed in a coolant flow path configured to receive a coolant from a coolant supply to exchange heat between the fuel cell system and the coolant in the coolant flow path.

In embodiments, the heat transfer device can be a first heat transfer device, and the thermal management system can include a second heat transfer device disposed in the coolant flow path to receive the first coolant from the first coolant flow path. The second heat transfer device can be disposed in a second coolant flow path fluidly isolated from the first coolant flow path, configured to receive a second coolant from a second coolant supply through the second heat transfer device to exchange heat between the first coolant and the second coolant.

In certain embodiments, the first heat transfer device includes a cold plate and wherein the second heat transfer device includes a multi-fluid heat exchanger. The cold plate can have a channel therein, the channel extending between an inlet and an outlet for passing the first coolant through the cold plate. The multi-fluid heat exchanger can have a first channel therein, the first channel extending between a first inlet and a first outlet for passing the first coolant through the multi-fluid heat exchanger. The multi-fluid heat exchanger can have a second channel therein, the second channel extending between a second inlet and a second outlet for passing the second coolant through the multi-fluid heat exchanger. The first channel and the second channel are in thermal communication and in fluid isolation with respect to one another within the multi-fluid heat exchanger.

In embodiments, the first coolant supply can include a refrigerant tank and the first coolant can include refrigerant. In certain embodiments, the second coolant supply can include a ram air turbine and the second coolant can include ram air. In certain embodiments, the first coolant flow path can be coolant loop, and an outlet of the second coolant flow path can be configured to exhaust the ram air to ambient.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
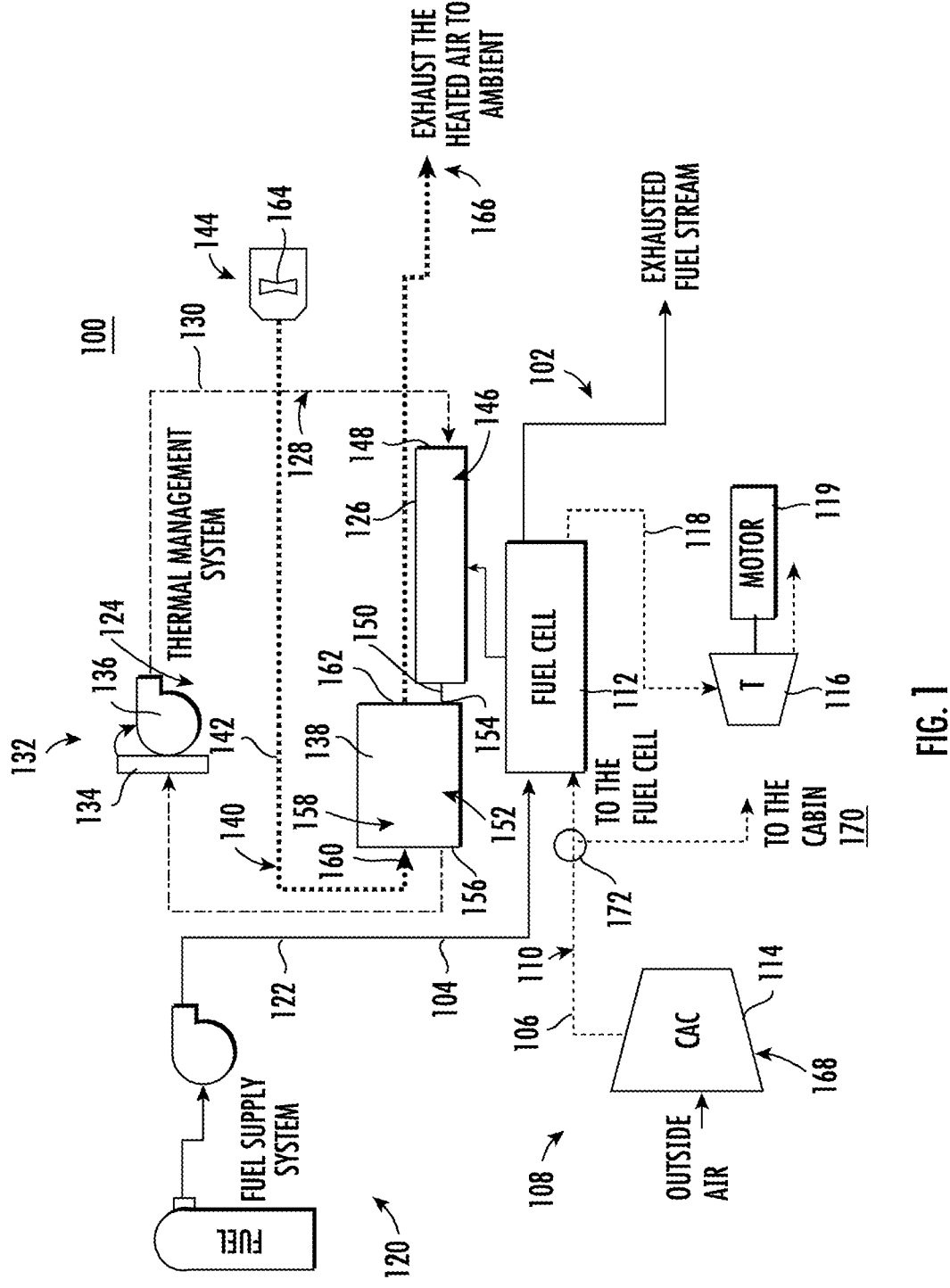
FIG. 1 is a schematic diagram of an emergency power unit system in accordance with this disclosure, showing an embodiment of an oxidant supply system.
Figure 2:
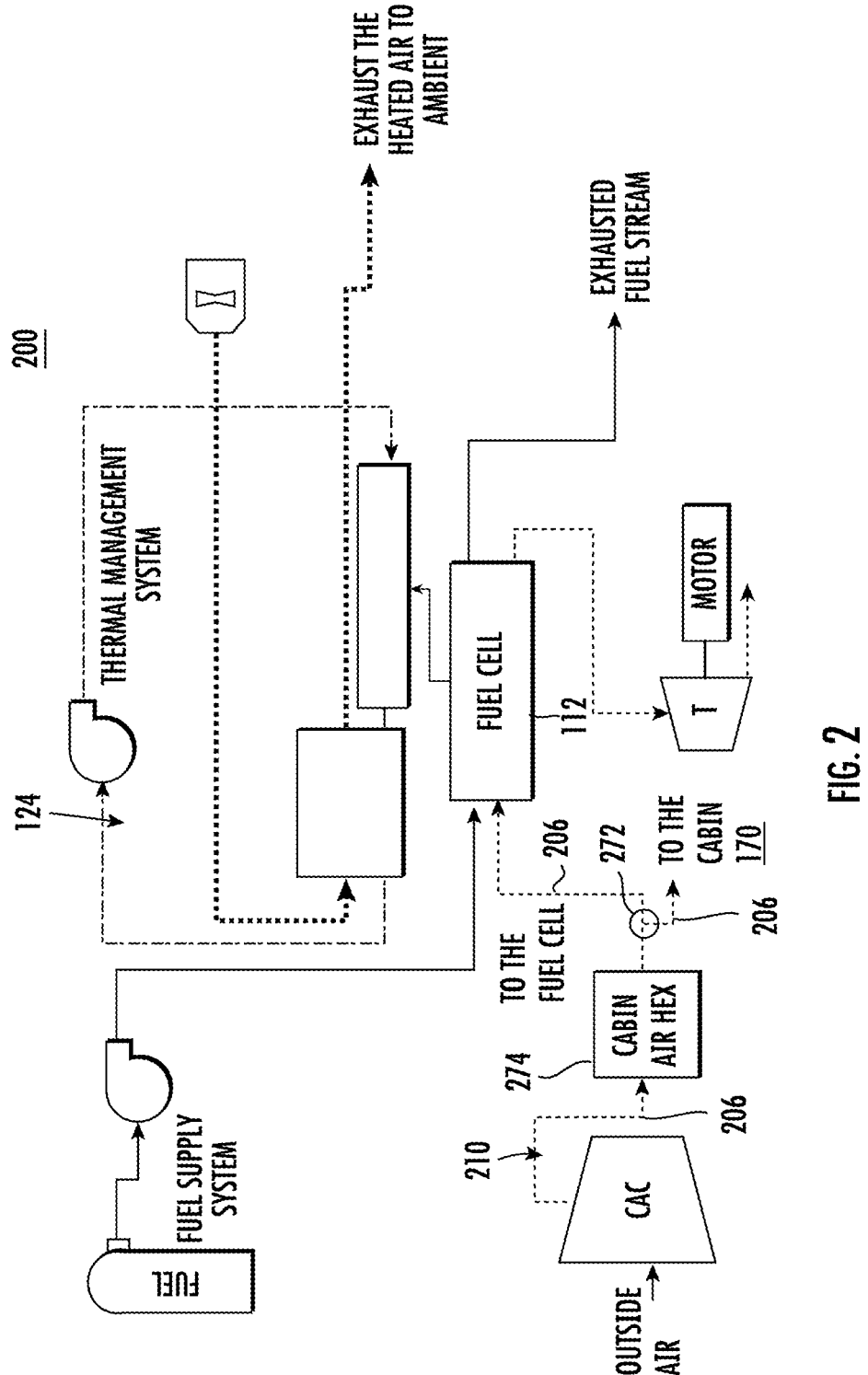
FIG. 2 is a schematic diagram of an emergency power unit system in accordance with this disclosure, showing another embodiment of an oxidant supply system.
Figure 3:
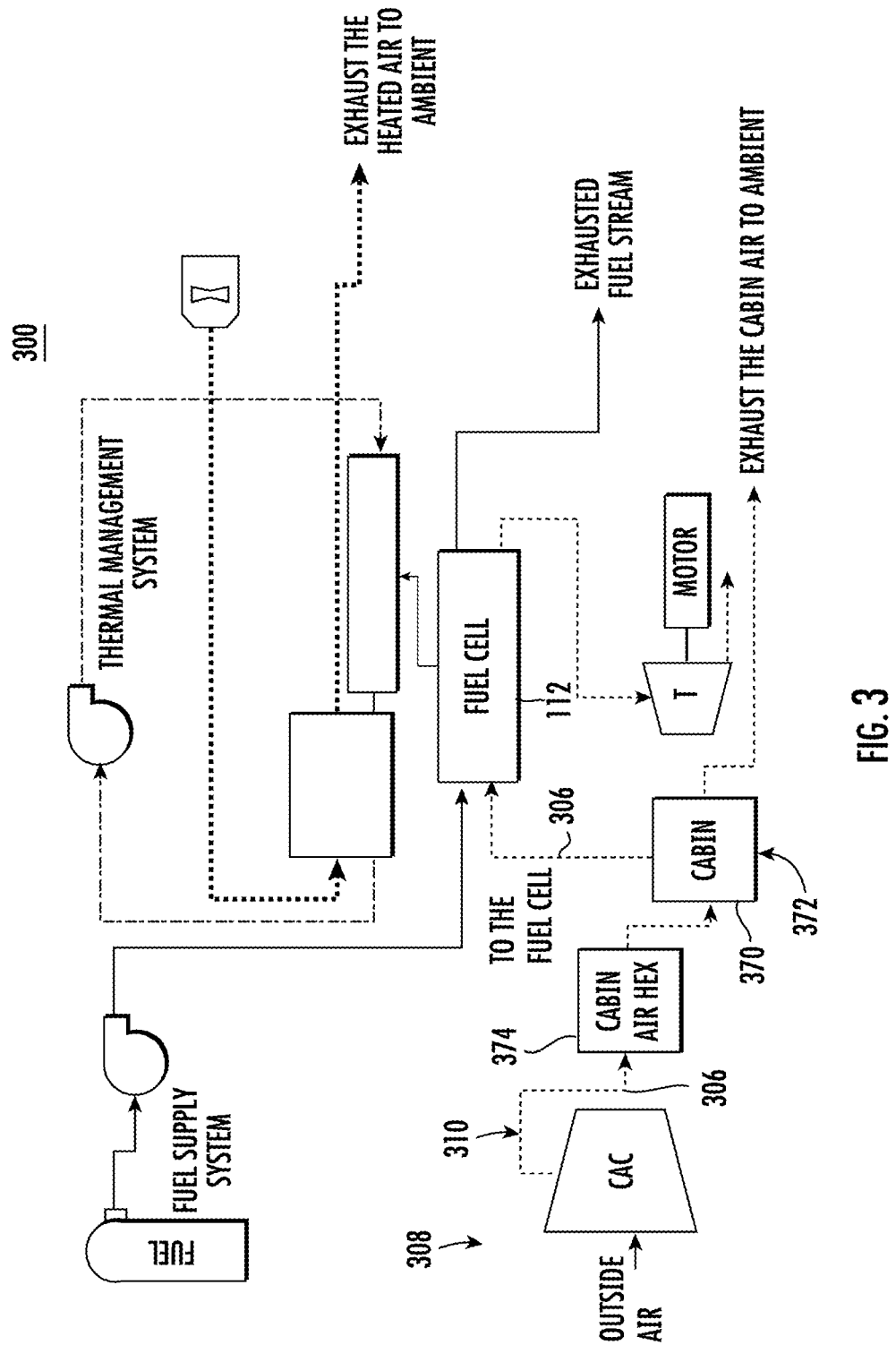
FIG. 3 is a schematic diagram of an emergency power unit system in accordance with this disclosure, showing another embodiment of an oxidant supply system.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-3.

In accordance with at least one aspect of this disclosure, an emergency power unit system 100 for an aircraft includes a fuel cell system 102 configured to generate power using a fuel 104 and an oxidant 106, and an oxidant supply system 108 fluidly connected to the fuel cell system 102 to supply the oxidant 106 to the fuel cell system 102 via an oxidant supply line 110.

In embodiments, the fuel cell system 102 can include, a fuel cell 112 fluidly connected to the oxidant supply line 110 to receive the oxidant 106, a compressor 114 configured to receive the oxidant 106 and compress the oxidant 106 upstream of the fuel cell 112, and a turbine 116 downstream from the fuel cell 112 to receive exhaust flow 118 and operatively connected to the compressor 114 to turn the compressor 114. For example, in certain embodiments, the turbine can be connected to the compressor 114 via a shaft. In certain embodiments, the compressor 114 may be mechanically disconnected from the turbine 116. In such embodiments, the turbine 116 can be operatively connected to turn a generator to generate electrical power, and may not be connected to another compressor.

A fuel supply system 120 can be fluidly connected to the fuel cell system 102 to supply the fuel 104 to the fuel cell system 102 via a fuel supply line 122, the fuel cell 112 fluidly connected to the fuel supply line 122 to receive the fuel 104. A thermal management system 124 can be in thermal communication with the fuel cell system 102 to divert heat from the fuel cell system 102 to the thermal management system 124.

In embodiments, the thermal management system 124 can include a heat transfer device 126 disposed in a coolant flow path 128 configured to receive a coolant 130 from a coolant supply 132 to exchange heat between the fuel cell system 102 and the coolant 130 in the coolant flow path 128. The coolant supply 132 can include a coolant tank 134 and pump 136.

In embodiments, the heat transfer device 126 can be a first heat transfer device, and the thermal management system 124 can include a second heat transfer device 138 disposed in the coolant flow path 128 to receive the first coolant 130 from the first coolant flow path 128. The second heat transfer device 138 can also be disposed in a second coolant flow 140 path fluidly isolated from the first coolant flow path 128 within the second heat transfer device 138. The second heat transfer device 138 can be configured to receive a second coolant 142 from a second coolant supply 144 through the second heat transfer device 138 to exchange heat between the first coolant 130 and the second coolant 142.

In certain embodiments, the first heat transfer device 126 includes a cold plate and the second heat transfer device 138 includes a multi-fluid heat exchanger. The cold plate 126 can have an internal channel 146 extending between an inlet 148 and an outlet 150 for passing the first coolant 130 through the cold plate 126. The multi-fluid heat exchanger 138 can have a first channel 152 therein, the first channel 152 extending between a first inlet 154 and a first outlet 156 for passing the first coolant 130 through the multi-fluid heat exchanger 138. The multi-fluid heat exchanger 138 can have a second channel 158 therein, the second channel 158 extending between a second inlet 160 and a second outlet 162 for passing the second coolant 142 through the multi-fluid heat exchanger 138. The first channel 152 and the second channel 158 are in thermal communication but in fluid isolation with respect to one another within the multi-fluid heat exchanger 138.

In embodiments, the first coolant supply 132 can include a refrigerant tank 134 and the first coolant 130 can include refrigerant (e.g., glycol or the like). In certain embodiments, the second coolant supply 144 can include a ram air duct 164 and the second coolant 142 can include ram air. Any other suitable coolant supply is contemplated herein, for example, aircraft greywater, aircraft fuel, or aircraft cabin air. In certain embodiments, the first coolant flow path 128 can be coolant loop where the pump 136 can be a recirculation pump. An outlet 166 of the second coolant flow path 140 can be configured to exhaust the ram air 142 to ambient.

In certain embodiments, such as shown in FIG. 1, the oxidant supply system 108 is fluidly connected to an environmental control system 168 of the aircraft. In embodiments, the compressor 114 can be a cabin air compressor 114 operatively connected to supply air to an aircraft cabin 170 and the oxidant 106 can be cabin air compressor exhaust. Here the compressor 114 may not be connected (e.g., mechanically connected) to the turbine 116 of the fuel cell system 102. In certain embodiments, the oxidant supply line 110 can include a branch point 172 upstream of the aircraft cabin 170 and upstream of the fuel cell 112. At the branch point, a portion of the cabin air compressor exhaust 106 can be diverted to the fuel cell 112 for oxidizing and a portion of the cabin air compressor exhaust 106 can be diverted to the aircraft cabin 170 (e.g., for passenger consumption).

With reference now to FIG. 2, another embodiment of an emergency power unit system 200 is shown. The emergency power unit system 200 can be similar to that of the emergency power unit system 100, for example emergency power unit system 200 can have similar components and features with respect to emergency power unit system 100. For brevity, the description of common elements that have been described above for emergency power unit system 100 are not repeated with respect to emergency power unit system 200 as shown in FIG. 2.

In certain embodiments, a heat exchanger 274 (e.g., separate from the thermal management system 124) can be included in the oxidant supply line 210 upstream of the branch point 272 configured to cool the cabin air compressor exhaust 206 before the cabin air is diverted to the fuel cell 112 and the cabin 170.

With reference now to FIG. 3, another embodiment of an emergency power unit system 300 is shown. The emergency power unit system 300 can be similar to that of the emergency power unit system 200, for example emergency power unit 200 can have similar components and features with respect to emergency power unit 100. For brevity, the description of common elements that have been described above for emergency power unit 100 are not repeated with respect to emergency power unit 200 as shown in FIG. 2

In embodiments, the oxidant supply line 310 can include a branch point 372, and at the branch point 372, a portion of the cabin air 306 can be diverted to the fuel cell 112 for oxidizing and a portion of the cabin air 306 can be exhausted to ambient (e.g., outside of the cabin). Here, the oxidant supply system 308 supplies the oxidant (cabin air) directly from the cabin 372, thus the branch point 372 can be the aircraft cabin 370 itself. In this case, the air from the cabin 372 that has been used for passenger consumption is already pressurized before reaching the fuel cell 112, so a smaller quantity of air is needed as the oxidant to generate power by the fuel cell 112. The heat exchanger 374 can be disposed in the oxidant supply line 310 upstream of the aircraft cabin 372 configured to cool the cabin air compressor exhaust before the cabin air compressor exhaust 306 is supplied to the aircraft cabin 372. This can be particularly useful when the aircraft is closer to the ground where the supply air is hotter than at higher altitudes, or in situations where the cabin air compressor 114 is not functional (e.g., in an emergency or power outage).

Embodiments allow for the fuel cell system to piggy-back on the cabin air compressor to supply at least some, if not all, of the oxidant for the fuel cell system. The compressor design for the fuel cell system can be simplified because the flow rate of the cabin air compressor would be higher than a dedicated compressor for the fuel cell, as in traditional systems, for example. Embodiments can reduce the number of ram air scoops for supplying air to the oxidant supply system. For example, the emergency power unit system 100, 200, 300 can utilize only a single ram air scoop for supplying air to the cabin air compressor (the compressor supplying the oxidant to the fuel cell system). In embodiments, using the cabin air compressor, and in certain embodiments including a heat exchanger upstream of the fuel cell system, can provide ideal air temperatures to the fuel cell. For example, embodiments can provide air to the inlet of the fuel cell at temperature less than 98° C.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. An emergency power unit system for an aircraft, comprising:
   a fuel cell system configured to generate power using a fuel and an oxidant; and
   an oxidant supply system fluidly connected to the fuel cell system and configured to supply the oxidant to the fuel cell system via an oxidant supply line;
   wherein the fuel cell system comprises:
      a fuel cell fluidly connected to the oxidant supply line and configured to receive the oxidant;
      a cabin air compressor configured to receive the oxidant and compress the oxidant upstream of the fuel cell, wherein the oxidant is cabin air compressor exhaust; and
      a turbine downstream from the fuel cell and configured to receive exhaust flow, the turbine operatively connected to the cabin air compressor and configured to turn the cabin air compressor; and
   wherein the oxidant supply line includes a branch point such that, at the branch point, a portion of the cabin air compressor exhaust is diverted to the fuel cell for oxidation and another portion of the cabin air compressor exhaust is diverted to an aircraft cabin.

2. The system of claim 1, further comprising a heat exchanger disposed in the oxidant supply line upstream of the aircraft cabin, the heat exchanger configured to cool the cabin air compressor exhaust before the cabin air compressor exhaust is supplied to the aircraft cabin.

3. The system of claim 1, further comprising:
   a fuel supply system fluidly connected to the fuel cell system and configured to supply the fuel to the fuel cell system via a fuel supply line, wherein the fuel cell is fluidly connected to the fuel supply line and configured to receive the fuel.

4. The system of claim 1, further comprising:
   a thermal management system in thermal communication with the fuel cell system and configured to divert heat from the fuel cell system to the thermal management system.

5. The system of claim 4, wherein the thermal management system includes a heat transfer device disposed in a coolant flow path, the heat transfer device configured to receive a coolant from a coolant supply and to exchange heat between the fuel cell system and the coolant in the coolant flow path.

6. The system of claim 5, wherein:
the heat transfer device is a first heat transfer device;
the coolant is a first coolant;
the coolant supply is a first coolant supply;
the coolant flow path is a first coolant flow path; and
the thermal management system further includes a second heat transfer device that is (i) disposed in the first coolant flow path and configured to receive the first coolant from the first coolant flow path and (ii) disposed in a second coolant flow path fluidly isolated from the first coolant flow path, the second heat transfer device configured to receive a second coolant from a second coolant supply and to exchange heat between the first coolant and the second coolant.

7. The system of claim 6, wherein:
the first heat transfer device includes a cold plate having a channel therein, the channel extending between an inlet and an outlet for passing the first coolant through the cold plate;
the second heat transfer device includes a multi-fluid heat exchanger having a first channel and a second channel therein, the first channel extending between a first inlet and a first outlet for passing the first coolant through the multi-fluid heat exchanger, the second channel extending between a second inlet and a second outlet for passing the second coolant through the multi-fluid heat exchanger; and
the first channel and the second channel are in thermal communication and in fluid isolation with respect to one another within the multi-fluid heat exchanger.

8. The system of claim 7, wherein:
the first coolant supply includes a refrigerant tank;
the first coolant includes refrigerant;
the second coolant supply includes a ram air duct; and
the second coolant includes ram air.

9. The system of claim 8, wherein:
the first coolant flow path is a coolant loop; and
an outlet of the second coolant flow path is configured to exhaust the ram air to an ambient environment.

10. An emergency power unit system for an aircraft, comprising:
a fuel cell system configured to generate power using a fuel and an oxidant;
an oxidant supply system fluidly connected to the fuel cell system and configured to supply the oxidant to the fuel cell system via an oxidant supply line;
wherein the fuel cell system comprises:
a fuel cell fluidly connected to the oxidant supply line and configured to receive the oxidant; and
a cabin air compressor configured to receive the oxidant and compress the oxidant upstream of the fuel cell, wherein the oxidant is cabin air compressor exhaust; and
wherein the oxidant supply line includes a branch point such that, at the branch point, a portion of the cabin air compressor exhaust is diverted to the fuel cell for oxidation and another portion of the cabin air compressor exhaust is diverted to an aircraft cabin; and
a heat exchanger disposed in the oxidant supply line upstream of the branch point, the heat exchanger configured to cool the cabin air compressor exhaust before the cabin air compressor exhaust is diverted to the fuel cell and the aircraft cabin.

11. The system of claim 10, further comprising:
a thermal management system in thermal communication with the fuel cell system and configured to divert heat from the fuel cell system to the thermal management system.

12. The system of claim 11, wherein the thermal management system includes a heat transfer device disposed in a coolant flow path, the heat transfer device configured to receive a coolant from a coolant supply and to exchange heat between the fuel cell system and the coolant in the coolant flow path.

13. A method comprising:
generating power with a fuel cell system using a fuel and an oxidant;
supplying the oxidant to the fuel cell system via an oxidant supply line with an oxidant supply system fluidly connected to the fuel cell system;
wherein the fuel cell system comprises:
a fuel cell fluidly connected to the oxidant supply line and receiving the oxidant; and
a cabin air compressor receiving the oxidant and compressing the oxidant upstream of the fuel cell, wherein the oxidant is cabin air compressor exhaust; and
wherein the oxidant supply line includes a branch point such that, at the branch point, a portion of the cabin air compressor exhaust is diverted to the fuel cell for oxidation and another portion of the cabin air compressor exhaust is diverted to an aircraft cabin; and
using a heat exchanger disposed in the oxidant supply line upstream of the branch point, cooling the cabin air compressor exhaust before the cabin air compressor exhaust is diverted to the fuel cell and the aircraft cabin.

14. The method of claim 13, further comprising:
using the heat exchanger disposed in the oxidant supply line upstream of the aircraft cabin, cooling the cabin air compressor exhaust before the cabin air compressor exhaust is supplied to the aircraft cabin.

15. The method of claim 13, further comprising:
using a fuel supply system fluidly connected to the fuel cell system, supplying the fuel to the fuel cell system via a fuel supply line;
wherein the fuel cell is fluidly connected to the fuel supply line.

16. The method of claim 13, further comprising:
using a thermal management system in thermal communication with the fuel cell system, diverting heat from the fuel cell system to the thermal management system.

17. The method of claim 16, wherein the thermal management system includes a heat transfer device disposed in a coolant flow path, the heat transfer device receiving a coolant from a coolant supply and exchanging heat between the fuel cell system and the coolant in the coolant flow path.

18. The method of claim 17, wherein:
the heat transfer device is a first heat transfer device;
the coolant is a first coolant;
the coolant supply is a first coolant supply;
the coolant flow path is a first coolant flow path; and
the thermal management system further includes a second heat transfer device that is (i) disposed in the first coolant flow path and receives the first coolant from the first coolant flow path and (ii) disposed in a second coolant flow path fluidly isolated from the first coolant flow path, the second heat transfer device receiving a second coolant from a second coolant supply and exchanging heat between the first coolant and the second coolant.

19. The method of claim 18, wherein:

the first heat transfer device includes a cold plate having a channel therein, the channel extending between an inlet and an outlet for passing the first coolant through the cold plate;

the second heat transfer device includes a multi-fluid heat exchanger having a first channel and a second channel therein, the first channel extending between a first inlet and a first outlet for passing the first coolant through the multi-fluid heat exchanger, the second channel extending between a second inlet and a second outlet for passing the second coolant through the multi-fluid heat exchanger; and the first channel and the second channel are in thermal communication and in fluid isolation with respect to one another within the multi-fluid heat exchanger.

20. The method of claim 19, wherein:

the first coolant supply includes a refrigerant tank;

the first coolant includes refrigerant;

the second coolant supply includes a ram air duct; and the second coolant includes ram air.

\* \* \* \* \*